T. HENDERSON.
INTERNAL FITTING FOR BOILER TUBES.
APPLICATION FILED JAN. 16, 1917.
1,243,168.
Patented Oct. 16, 1917.
2 SHEETS—SHEET 1.
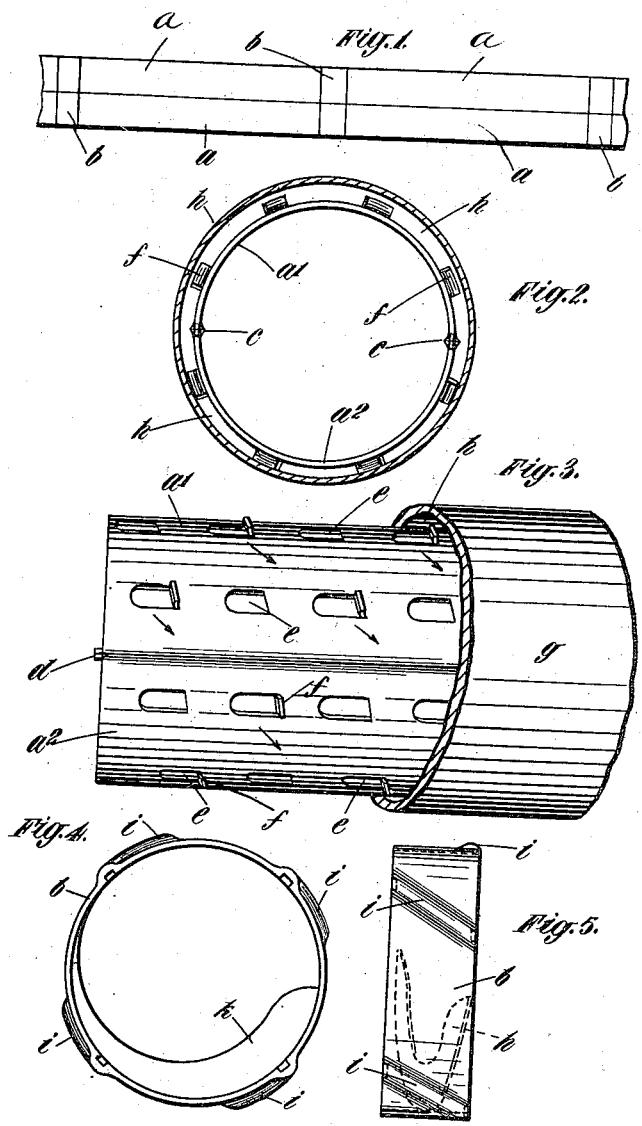
INVENTOR
TURNER HENDERSON
BY: H van Oldenmul
ATTORNEY.

T. HENDERSON.
INTERNAL FITTING FOR BOILER TUBES.
APPLICATION FILED JAN. 16, 1917.
1,243,168.
Patented Oct. 16, 1917.
2 SHEETS—SHEET 2.
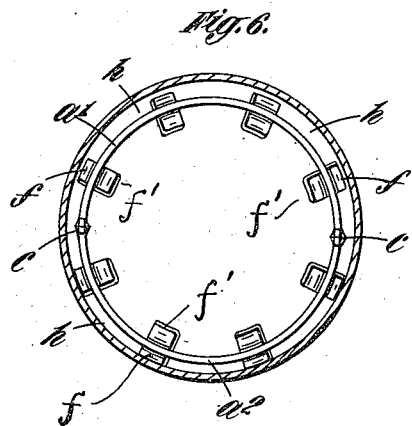
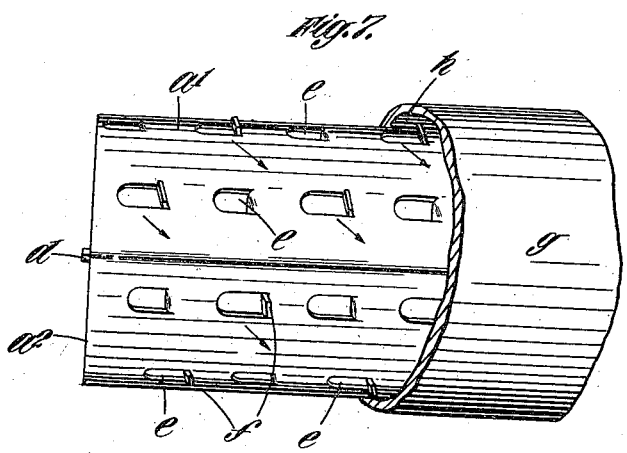
INVENTOR
Turner Henderson
by
Attorney

UNITED STATES PATENT OFFICE.

TURNER HENDERSON, OF ABINGDON, ENGLAND.

INTERNAL FITTING FOR BOILER-TUBES.

1,243,168.  Specification of Letters Patent.  Patented Oct. 16, 1917.

Application filed January 16, 1917. Serial No. 142,724.

*To all whom it may concern:*

Be it known that I, TURNER HENDERSON, a citizen of the United Kingdom of Great Britain and Ireland, and resident of The Coppice, Clifton Hampden, Abingdon, in the county of Berks, England, have invented certain new and useful Improvements in Internal Fittings for Boiler-Tubes, of which the following is a specification, such as will enable others skilled in the art to which it appertains to make and use the same.

This invention relates to linings for boiler tubes of the kind made from fire-clay or other such material which will become incandescent when sufficiently heated. These tubes have been made in sections of a diameter or other size sufficiently less than that of the tube or furnace to which they are applied as will leave an annular or other shaped space between the lining and the tube or passage in which it is used. Projections on the linings have been employed to "center" them in the tubes and it has been proposed to form openings through the linings to permit the passage of hot gases.

According to the present invention the lining which is made in lengths or sections has in it openings set spirally and some or all of which are provided with tongues or lips projecting outwardly and serving for the purpose firstly, of holding the lining the requisite distance from the tube and secondly, directing the gases passing along the annular space so that they will travel in spiral fashion.

I prefer to make the sections in semi-cylindrical form and to arrange them in pairs with a ring of preferably the same material between the ends of one pair and those of the next. If desired these rings may have in them spirally set flanges or ribs, and the semi-cylindrical portions may also have projections on their inner sides said ribs and projections tending to give the hot gases inside the lining a spiral direction.

The chief object of the invention is to obtain greater heating effect from the gas and thus increase the efficiency of the boiler to the tubes of which my improved form of lining is applied.

The rings may be of any suitable form, and may also have any means to keep them in place.

In order that the invention may be clearly understood, reference will now be had to the accompanying drawing which illustrates the same by way of example.

Figure 1 is a diagrammatic general view of the arrangement of the sections with rings between them.

Fig. 2 is an end view of a boiler tube in which my linings have been placed.

Fig. 3 is a view in perspective of part of a tube with the linings in position.

Figs. 4 and 5 are two views of a suitable form of ring.

Fig. 6 is an end view of a boiler tube and a lining which has inside and outside projections.

Fig. 7 is a view like that of Fig. 3, of the arrangement of Fig. 6.

In these drawings the sections $a$, $a$ are separated by rings $b$, the outer and inner dimensions of which are substantially the same as those of the sections. As shown in Figs. 2 and 3, the sections are made in two parts $a^1$, $a^2$, the abutting edges of which are slightly thickened as shown at $c$, and provided with projections $d$ to engage with sockets in the rings $b$ to assist in securing correct alinement.

The sections have openings $e$ some of which are provided with external flanges $f$. These openings are set spirally so that the flanges will serve the double purpose of centering the sections in the boiler tubes $g$ and causing the hot gases passing up the space $h$ between the outside of the sections and the inside of the tubes, to travel spirally as indicated by the arrows in Fig. 3. In Figs. 4 and 5, the ring shown has external ribs $i$, to properly center the rings in relation to the tubes and the sections. These ribs are also spirally set, to conform to the direction of the flanges $f$. Inside the ring is shown a spirally set flange or web $k$, which will impart a spiral movement to the gases inside the tube and thus tend to prevent the direct rushing through of the hottest gases in the center of the section, by breaking up the outermost of the gases inside the tube which would tend to act as heat insulators for the gases in the center of the tube.

The eddies in the stream of gases produced by this device are favorable to increased combustion and temperature and the hot gases are freely in contact with both surfaces of the lining. Fine particles or cinders carried along in the stream of hot gases can pass freely up the tube and do not accumulate. As the spiral is interrupted so much there is no material reduction of the volume of the gases in the tube in practice.

The lining may have projections, *f*, as before stated, on the outside thereof, or, as an alternative, or in addition, may have inwardly-projecting tongues, *f'*, as shown in Figs. 6 and 7.

What I claim and desire to secure by Letters Patent is:—

1. A lining for the tube of a boiler said lining being in sections and having spirally arranged openings through the sections with externally projecting and spirally arranged tongues adjacent to some of said openings.

2. A lining for the tube of a boiler said lining being in sections and having spirally arranged openings through the sections with externally projecting and spirally arranged tongues adjacent to some of said openings and spirally set ribs inside the sections.

3. A lining for the tube of a boiler said lining comprising sections of fireproof material some of which are separated by rings of fireproof material, said sections having in them spirally arranged openings with spirally arranged projections both inside and outside the sections.

4. A lining for the tube of a boiler said lining comprising sections of fireproof material some of which are separated by rings of fireproof material, said sections having in them spirally arranged openings with spirally arranged projections both inside and outside the sections said rings also having spirally arranged projections.

5. A lining for the tube of a boiler said lining comprising semi-circular sections arranged in pairs, a ring between the ends of adjoining pairs, spirally arranged openings through the sections, spirally set projections outside the sections and spirally set projections outside the rings.

6. A lining for the tube of a boiler said lining comprising semi-circular sections arranged in pairs, a ring between the ends of adjoining pairs, spirally arranged openings through the sections, spirally set projections both inside and outside the sections and spirally set projections outside the rings.

7. A lining for the tube of a boiler said lining comprising semi-circular sections arranged in pairs, a ring between the ends of adjoining pairs, spirally arranged openings through the sections, spirally set projections both inside and outside the sections and spirally set projections both inside and outside the rings.

8. A lining for the tube of a boiler said lining comprising tubular sections having in them spirally set openings and having spirally arranged projections on their outer surfaces, rings between the sections, projections on the sections and projections on the rings.

9. A lining for the tube of a boiler said lining comprising tubular sections having in them spirally set openings and having spirally arranged projections on their inner and on their outer surfaces, rings between the sections, projections on the ends of the sections and recesses in the ends of the rings.

10. A lining for the tube of a boiler said lining comprising tubular sections having in them spirally set openings and having spirally arranged projections on their inner and on their outer surface, rings between the sections, projections on the ends of the sections and recesses in the ends of the rings and projections outside the rings.

11. A lining for the tube of a boiler said lining comprising tubular sections having in them spirally set openings and having spirally arranged projections on their inner and on their outer surfaces, rings between the sections, projections on the ends of the sections and recesses in the ends of the rings and spirally set projections inside the rings and spirally set projections outside the rings.

12. A lining for the tube of a boiler said lining comprising tubular sections of fireproof material in semi-circular pieces, spirally set openings through the sections, spirally set projections both inside and outside the sections, a ring between the adjacent ends of each section, spirally set projections outside the rings with projections and recesses at the ends of the sections and of the rings for the purpose of keeping the rings and the sections in correct relative positions.

In witness whereof I have hereunto set my hand in presence of two witnesses.

TURNER HENDERSON.

Witnesses:
HENRY FAIRBROTHER,
ELIZABETH PARRY.

Copies of this patent may be obtained for five cents each, by addressing the "Commissioner of Patents, Washington, D. C."